D. K. STUMP.
MEANS FOR CONTROLLING AUTOMOBILE LAMPS.
APPLICATION FILED JULY 3, 1919.
1,334,187.  Patented Mar. 16, 1920.
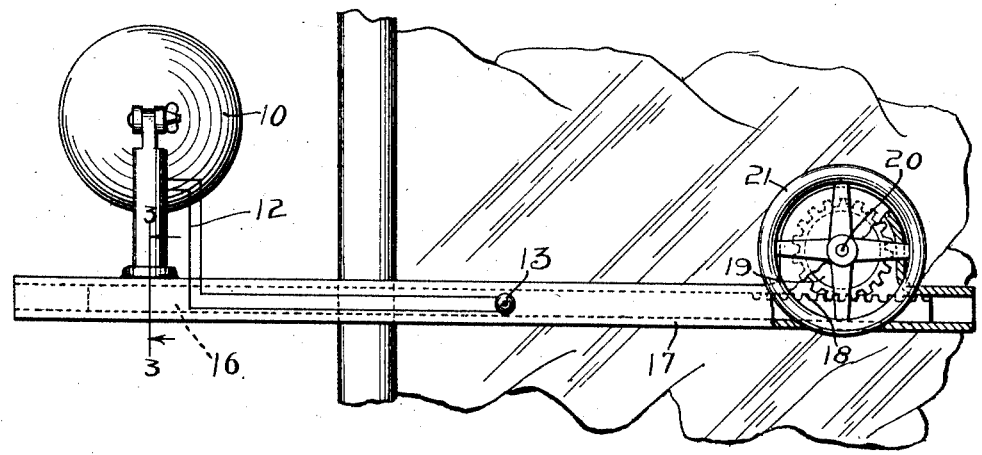
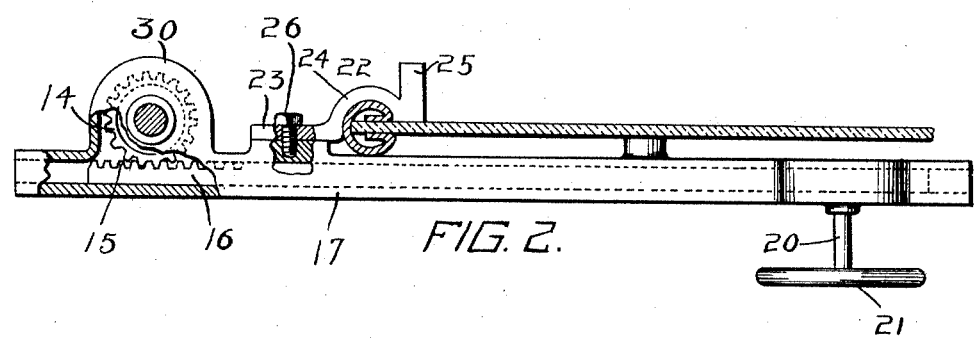
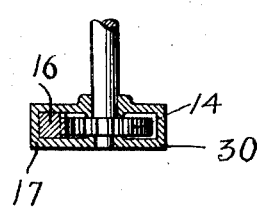
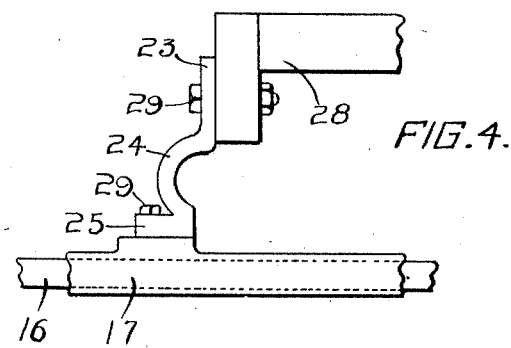
Witnesses
R. A. Thomas
I. M. Burns
Inventor
Delano K. Stump.
By Victor J. Evans
Attorney

UNITED STATES PATENT OFFICE.

DELANO K. STUMP, OF CIRCLEVILLE, OHIO.

MEANS FOR CONTROLLING AUTOMOBILE-LAMPS.

1,334,187.

Specification of Letters Patent. Patented Mar. 16, 1920.

Application filed July 3, 1919. Serial No. 308,427.

*To all whom it may concern:*

Be it known that I, DELANO K. STUMP, a citizen of the United States, residing at Circleville, in the county of Pickaway and State of Ohio, have invented new and useful Improvements in Means for Controlling Automobile-Lamps, of which the following is a specification.

This invention relates to means for controlling the lamps of automobiles, and the object is to provide a spot light mounted for rotation on a vertical support and controlled by a rack bar, said bar being in turn controlled by a rotatable member including a gear wheel meshing with a series of teeth on the rack bar independent of the teeth controlling a gear wheel carried by the vertical support of the lamp.

A further object is to provide mounting means for the controlling device above specified and including a frame within which the rack bar is movable longitudinally, and a clamping member for mounting the frame in the required position and securing the latter to the wind shield of a car, the securing device being also adapted for connecting the frame to the front portion of the frame of a closed car.

With the foregoing and other objects in view, the invention consists in the novel construction, combination, and arrangement of elements hereinafter described and claimed.

In the drawings,

Figure 1 is a view of the lamp controlling device in elevation, as applied to a windshield.

Fig. 2 is a view in top plan and horizontal section,

Fig. 3 is a section on line 3—3 of Fig. 1,

Fig. 4 is a detail in top plan, the supporting bracket being applied to the frame of a closed car, instead of a windshield.

A spot light designated 10 is supplied with current by means of wires 12 controlled from a push button or other form of switch 13. The casing of the lamp is mounted on a vertical member carrying a gear wheel 14 meshing with a series of teeth 15 on a rack bar 16.

The rack bar is movable longitudinally within a frame 17 constituting a supporting device. The outer end of the rack bar is provided with a series of teeth 18 engaged by a gear wheel 19 carried on a stem 20 the latter being provided with a hand wheel 21, for operating the rack bar and controlling the position of a spot light in order to throw the rays in any direction desired.

In order to provide for mounting the frame 17 I provide a clamping member 22 including a flattened portion 23 a curved portion 24 and a flat portion 25 extending at an angle with the portion 23. In mounting the device on an open car the curved portion 24 is passed around the side member of wind shield and the clamp is secured by means of a bolt 26. When desired to use the device on a closed car the position of the clamp is shifted and the flat end 25 extending at right angles with the member 23 is secured to the frame 17 of the controlling device, the portion 23 being clamped to the front portion of the frame of the car, the latter being shown at 28. The bolts 29 hold the clamp in position on the element 28.

It should be added that the vertical member supporting the lamp casing is mounted in frame members 30 carried by the frame 17.

What is claimed is:

In a device of the class described, a frame, means mounted therein for controlling a lamp and throwing the rays in various directions, and means for securing the frame to a stationary element of a vehicle, said means last named comprising an element having two straight portions at an angle with each other and a curved portion located intermediate of the straight portions, said curved portion and one of the straight portions each being adapted to engage a stationary element of a vehicle, one of said portions being engaged at a given time.

In testimony whereof I affix my signature.

DELANO K. STUMP.